(12) United States Patent
Baumann et al.

(10) Patent No.: US 8,357,455 B2
(45) Date of Patent: Jan. 22, 2013

(54) TRANSPARENT MOULDING COMPOUND

(75) Inventors: Franz-Erich Baumann, Dülmen (DE);
Roland Wursche, Dülmen (DE); Harald Häger, Lüdinghausen (DE); Sonja Bollmann, Haltern am See (DE);
Kirsten Alting, Münster (DE)

(73) Assignee: Evonik Degussa GmbH, Essen (DE)

( * ) Notice: Subject to any disclaimer, the term of this patent is extended or adjusted under 35 U.S.C. 154(b) by 179 days.

(21) Appl. No.: 11/813,103

(22) PCT Filed: Nov. 9, 2005

(86) PCT No.: PCT/EP2005/055854
§ 371 (c)(1),
(2), (4) Date: Oct. 16, 2007

(87) PCT Pub. No.: WO2006/072496
PCT Pub. Date: Jul. 13, 2006

(65) Prior Publication Data
US 2008/0119632 A1 May 22, 2008

(30) Foreign Application Priority Data

Dec. 29, 2004 (DE) .......................... 10 2004 063 220

(51) Int. Cl.
*B32B 27/34* (2006.01)
(52) U.S. Cl. .................... 428/474.4; 428/35.5; 428/395; 528/271; 528/310; 528/329.1; 528/335; 528/338; 528/340; 528/367; 525/432; 264/172.18; 264/173.1; 156/60; 156/242
(58) Field of Classification Search .................. 528/310, 528/328, 322, 271, 340, 339, 335, 338, 346, 528/330, 272, 301, 324, 329.1, 367; 525/432; 428/474.4, 374, 395, 34.1, 34.8, 35.7, 392, 428/394, 35.5; 264/172.11, 172.17, 172.18, 264/172.14, 172.15, 173.1; 156/60, 242, 156/244.11, 244.24
See application file for complete search history.

(56) References Cited

U.S. PATENT DOCUMENTS

| | | | |
|---|---|---|---|
| 5,313,987 A | 5/1994 | Rober et al. |
| 5,404,915 A | 4/1995 | Mugge et al. |
| 5,425,817 A | 6/1995 | Mugge et al. |
| 5,500,263 A | 3/1996 | Rober et al. |
| 5,512,342 A | 4/1996 | Rober et al. |
| 5,554,426 A | 9/1996 | Rober et al. |
| 5,798,048 A | 8/1998 | Ries |
| 5,858,492 A | 1/1999 | Rober et al. |
| 6,090,459 A | 7/2000 | Jadamus et al. |
| 6,161,879 A | 12/2000 | Ries et al. |
| 6,335,101 B1 | 1/2002 | Haeger et al. |
| 6,355,358 B1 | 3/2002 | Boer et al. |
| 6,391,982 B1 | 5/2002 | Haeger et al. |
| 6,407,182 B1 | 6/2002 | Maul et al. |
| 6,428,866 B1 | 8/2002 | Jadamus et al. |
| 6,451,395 B1 | 9/2002 | Ries et al. |
| 6,528,137 B2 | 3/2003 | Franosch et al. |
| 6,538,073 B1 | 3/2003 | Oenbrink et al. |
| 6,579,581 B2 | 6/2003 | Bartz et al. |
| 6,660,796 B2 | 12/2003 | Schueler et al. |
| 6,677,015 B2 | 1/2004 | Himmelmann et al. |
| 6,680,093 B1 | 1/2004 | Ries et al. |
| 6,726,999 B2 | 4/2004 | Schueler et al. |
| 6,766,091 B2 | 7/2004 | Beuth et al. |
| 6,783,821 B2 | 8/2004 | Ries et al. |
| 6,793,997 B2 | 9/2004 | Schmitz |
| 6,794,048 B2 | 9/2004 | Schmitz et al. |
| 6,884,485 B2 | 4/2005 | Baumann et al. |
| 7,025,842 B2 | 4/2006 | Monsheimer et al. |
| 7,135,525 B2 | 11/2006 | Petter et al. |
| 7,148,286 B2 | 12/2006 | Baumann et al. |
| 7,175,896 B2 | 2/2007 | Schmitz et al. |
| 7,317,044 B2 | 1/2008 | Monsheimer et al. |
| 2001/0018105 A1 | 8/2001 | Schmitz et al. |
| 2002/0142118 A1 | 10/2002 | Schmitz et al. |
| 2002/0179888 A1 | 12/2002 | Montanari et al. |
| 2003/0072987 A1 | 4/2003 | Ries et al. |
| 2003/0124281 A1 | 7/2003 | Ries et al. |
| 2003/0173707 A1 | 9/2003 | Becker et al. |
| 2003/0212174 A1 | 11/2003 | Peirick et al. |
| 2004/0043233 A1* | 3/2004 | Berrier et al. ............. 428/474.7 |

(Continued)

FOREIGN PATENT DOCUMENTS

GB 1 326 023 8/1973

OTHER PUBLICATIONS

U.S. Appl. No. 11/685,283, filed Mar. 13, 2007, Dowe, et al.
U.S. Appl. No. 11/816,595, filed Aug. 17, 2007, Haeger, et al.
U.S. Appl. No. 11/816,588, filed Aug. 17, 2007, Haeger, et al.
U.S. Appl. No. 11/816,556, filed Aug. 17, 2007, Wursche, et al.
U.S. Appl. No. 12/089,926, filed Jun. 4, 2008, Haeger, et al.

(Continued)

*Primary Examiner* — Frances Tischler
(74) *Attorney, Agent, or Firm* — Oblon, Spivak, McClelland, Maier & Neustadt, L.L.P.

(57) ABSTRACT

The invention relates to the use of a molding composition which comprises at least 50% by weight of a copolyamide, which is composed of the following monomer combination:

a) from 65 to 99 mol % of a substantially equimolar mixture composed of an unbranched aliphatic diamine having from 6 to 18 carbon atoms and of an unbranched aliphatic dicarboxylic acid having from 6 to 18 carbon atoms,
where the mixture composed of diamine and dicarboxylic acid comprises an average of from 8 to 12 carbon atoms, b) from 1 to 35 mol % of a substantially equimolar mixture composed of a cycloaliphatic diamine having from 8 to 20 carbon atoms and of a dicarboxylic acid having from 6 to 18 carbon atoms, for production of a printable or printed item, such as a ski topcoat.

29 Claims, No Drawings

U.S. PATENT DOCUMENTS

| | | |
|---|---|---|
| 2004/0102539 A1 | 5/2004 | Monsheimer et al. |
| 2004/0106691 A1 | 6/2004 | Monsheimer et al. |
| 2004/0137228 A1 | 7/2004 | Monsheimer et al. |
| 2004/0140668 A1 | 7/2004 | Monsheimer et al. |
| 2004/0202908 A1 | 10/2004 | Schmitz et al. |
| 2004/0232583 A1 | 11/2004 | Monsheimer et al. |
| 2005/0014842 A1 | 1/2005 | Baumann et al. |
| 2005/0027050 A1 | 2/2005 | Monsheimer et al. |
| 2006/0071359 A1 | 4/2006 | Monsheimer et al. |
| 2006/0078752 A1 | 4/2006 | Schmitz et al. |
| 2006/0083882 A1 | 4/2006 | Schmitz et al. |
| 2006/0099478 A1 | 5/2006 | Schmitz et al. |
| 2006/0100323 A1 | 5/2006 | Schmidt et al. |
| 2006/0134419 A1 | 6/2006 | Monsheimer et al. |
| 2006/0141188 A1 | 6/2006 | Schmitz et al. |
| 2006/0182916 A1 | 8/2006 | Dowe et al. |
| 2006/0183869 A1 | 8/2006 | Dowe et al. |
| 2006/0189784 A1 | 8/2006 | Monsheimer et al. |
| 2006/0202395 A1 | 9/2006 | Monsheimer et al. |
| 2006/0223928 A1 | 10/2006 | Monsheimer et al. |
| 2006/0244169 A1 | 11/2006 | Monsheimer et al. |
| 2006/0281873 A1 | 12/2006 | Alting et al. |
| 2006/0292387 A1 | 12/2006 | Kuhmann et al. |
| 2007/0013108 A1 | 1/2007 | Monsheimer et al. |
| 2007/0055044 A1 | 3/2007 | Simon et al. |
| 2007/0104971 A1 | 5/2007 | Wursche et al. |
| 2007/0126159 A1 | 6/2007 | Simon et al. |
| 2007/0148388 A1 | 6/2007 | Kuhmann et al. |
| 2007/0166560 A1 | 7/2007 | Wursche et al. |
| 2007/0182070 A1 | 8/2007 | Monsheimer et al. |
| 2007/0183918 A1 | 8/2007 | Monsheimer et al. |
| 2007/0197692 A1 | 8/2007 | Monsheimer et al. |
| 2007/0232753 A1 | 10/2007 | Monsheimer et al. |
| 2007/0238056 A1 | 10/2007 | Baumann et al. |
| 2007/0260014 A1 | 11/2007 | Simon et al. |
| 2008/0116616 A1 | 5/2008 | Monsheimer et al. |
| 2008/0119632 A1 | 5/2008 | Baumann et al. |
| 2008/0166496 A1 | 7/2008 | Monsheimer et al. |
| 2008/0217821 A1 | 9/2008 | Goring et al. |
| 2008/0242782 A1 | 10/2008 | Hager et al. |
| 2008/0249237 A1 | 10/2008 | Hager et al. |
| 2009/0088508 A1 | 4/2009 | Monsheimer et al. |
| 2010/0221551 A1 | 9/2010 | Wursche et al. |

OTHER PUBLICATIONS

U.S. Appl. No. 12/105,672, filed Apr. 18, 2008, Simon, et al.
U.S. Appl. No. 12/192,208, filed Aug. 15, 2008, Goering, et al.
U.S. Appl. No. 12/438,142, filed Feb. 20, 2009, Luetzeler, et al.
U.S. Appl. No. 12/438,364, filed Feb. 23, 2009, Luetzeler, et al.
U.S. Appl. No. 12/373,547, filed Jan. 13, 2009, Luetzeler, et al.
U.S. Appl. No. 12/302,298, filed Nov. 25, 2008, Alting, et al.
U.S. Appl. No. 60/831,222, filed Jul. 17, 2006, Hager, et al.
U.S. Appl. No. 12/407,065, filed Mar. 19, 2009, Monsheimer, et al.
U.S. Appl. No. 12/515,543, filed May 20, 2009, Wursche, et al.
U.S. Appl. No. 12/989,899, filed Oct. 27, 2010, Wursche, et al.
U.S. Appl. No. 13/150,683, filed Jun. 1, 2011, Alting, et al.
U.S. Appl. No. 13/377,949, filed Dec. 13, 2011, Pawlik, et al.

* cited by examiner

TRANSPARENT MOULDING COMPOUND

CROSS REFERENCE TO RELATED APPLICATION

This application is a 371 of PCT/EP05/055854, filed Nov. 9, 2005, and claims priority of German Patent Application No. 10 2004 063 220.0, filed Dec. 29, 2004.

The invention relates to a transparent molding composition composed of a copolyamide and suitable for production of transparent, printable items. Examples of the items are films and in particular ski topcoats or snowboard topcoats.

Utility model DE 295 19 867 U1 describes a decoratable film composed of a copolyamide which is composed of the following monomer units: laurolactam and caprolactam and/or hexamethylenediamine/dicarboxylic acid. Although these copolyamides are generally transparent and also easy to decorate, problems constantly occur when these copolyamides are extruded to produce moldings or films. In particular, deposits form on the injection mold or extrusion die, or on the take-off rolls, and these cause frequent interruption of production for the necessary cleaning work. Furthermore, the heat resistance of these films is inadequate, and therefore there is a risk of deformation during decoration by means of sublimation print or thermal diffusion print. The temperature at which decoration has to be carried out is therefore lower than would actually be desirable in these processes.

The article by M. Beyer and J. Lohmar, Kunststoffe 90 (2000)1, pp. 98-101 gives examples of printable films composed of PA12 molding compositions. However, these films have the same disadvantages with regard to deposit formation and excessively low heat resistance.

It was a particular object of the present invention to provide a molding composition which on the one hand has sufficient crystallinity to achieve adequate stress cracking resistance but which on the other hand, however, is nevertheless sufficiently transparent. Sufficient stress cracking resistance is important firstly if the moldings or films manufactured from the material are also intended for decoration by screen printing or by offset printing as an additional or alternative process, and secondly in subsequent use if the finished parts are treated with alcohol-based cleaning compositions. Transparency must be adequate to permit reverse printing of the film with sufficient sharp contrast. Furthermore, deposit formation during processing of the molding composition should at least be markedly reduced. Another substantial aspect of the underlying object consisted in provision of a polyamide molding composition which can be processed to give items, such as moldings or films, which are also easy to print by means of thermal diffusion print or sublimation print. These thermal printing processes often demand increased heat resistance of the films or moldings. In the case of the molding compositions that can be used, heat resistance correlates with the crystallite melting point $T_m$; a $T_m$ of at least 180° C. is desirable for these thermal printing processes. Excessively low heat resistances are evident in warpage or deformation of the moldings or films to be printed. On the other hand, lowering of the sublimation temperature impairs contrast and print image sharpness, because the ink then fails to penetrate sufficiently deeply into the film. It is self-evident to the person skilled in the art that the other processing properties such as a firmly adhering adhesive bond to the substrate, e.g. to the ski body, or suitability for in-mold coating, may not be impaired via superficial ink residues which have not diffused into the material.

Surprisingly, this object could be achieved via the use of a molding composition which comprises at least 50% by weight, preferably at least 60% by weight, particularly preferably at least 70% by weight, 80% by weight, or 90% by weight, and with particular preference at least 95% by weight, of a copolyamide described below, for production of a printable or printed item.

The invention also provides the items produced from this molding composition.

The copolyamide that can be used according to the invention is composed of the following monomer combination:

a) from 65 to 99 mol %, preferably from 75 to 98 mol %, particularly preferably from 80 to 97 mol %, and with particular preference from 85 to 96 mol %, of a substantially equimolar mixture composed of an unbranched aliphatic diamine and of an unbranched aliphatic dicarboxylic acid, where the mixture is, if appropriate, present in the form of salt, and moreover diamine and dicarboxylic acid are respectively counted individually in the calculation of the constitution, with the proviso that the mixture composed of diamine and dicarboxylic acid comprises an average of from 8 to 12 carbon atoms and preferably from 9 to 11 carbon atoms per monomer;

b) from 1 to 35 mol %, preferably from 2 to 25 mol %, particularly preferably from 3 to 20 mol %, and with particular preference from 4 to 15 mol %, of a substantially equimolar mixture composed of a cycloaliphatic diamine and of a dicarboxylic acid.

The unbranched linear diamine used in a) generally has from 6 to 18 carbon atoms; examples of suitable compounds here are 1,6-hexamethylenediamine, 1,8-octamethylenediamine, 1,9-nonamethylenediamine, 1,10-decamethylenediamine, and 1,12-dodecamethylenediamine.

The unbranched linear dicarboxylic acid used in a) likewise generally has from 6 to 18 carbon atoms; examples of suitable compounds here are adipic acid, suberic acid, azelaic acid, sebacic acid, 1,12-dodecanedioic acid, brassylic acid, and 1,14-tetradecanedioic acid.

Preference is given to the following combinations: hexamethylenediamine/1,12-dodecanedioic acid, 1,10-decamethylenediamine/sebacic acid, hexamethylenediamine/sebacic acid, and 1,10-decamethylenediamine/1,12-dodecanedioic acid.

The cycloaliphatic diamine used in b) generally has from 8 to 24 carbon atoms. Examples of suitable compounds are 1,4- or 1,3-bis(aminomethyl)hexane, 4,4'-diaminodicyclo-hexylmethane, 4,4'-diamino-3,3'-dimethyldicyclohexylmethane, 4,4'-diamino-3,3'-dimethyl-dicyclohexylpropane, and also isophoronediamine.

The group from which the dicarboxylic acid used in b) is selected may be the same as that from which that used in a) is selected. The two dicarboxylic acids may be identical or different. However, it is also possible to use any other dicarboxylic acid preferably having from 6 to 18 carbon atoms, e.g. 2-methylpentanedioic acid, isophthalic acid, or cyclohexane-1,4-dicarboxylic acid.

Instead of dicarboxylic acids and diamines to prepare the copolyamide it is also possible, of course, to use their polyamide-forming derivatives.

In one preferred embodiment, the copolyamide has a crystallite melting point $T_m$ in the range from 180 to 220° C., particularly preferably in the range from 185 to 210° C., and with particular preference in the range from 190 to 200° C. The enthalpy of fusion of the copolyamide is moreover preferably at least 30 J/g, particularly preferably at least 45 J/g, and with particular preference at least 55 J/g. $T_m$ and enthalpy of fusion are determined via DSC to ISO 11357 in the 2nd heating curve using a heating rate of 20 K/min. The content of the monomer mixture of b) required to achieve the target value can easily be determined by the person skilled in the art via a few manual experiments.

The relative solution viscosity $\eta_{rel}$ of the copolyamide, measured on a 0.5% strength by weight solution in m-cresol at 23° C. to ISO 307, is generally from about 1.5 to about 2.5, preferably from about 1.7 to about 2.2, and particularly preferably from about 1.8 to about 2.1. In one preferred embodiment, the melt viscosity, measured in a mechanical spectrometer (cone-and-plate) to ASTM D4440 at 240° C. and at a shear rate of $100~s^{-1}$, is from 250 to 10 000 Pas, preferably from 350 to 8000 Pas, and particularly preferably from 500 to 5000 Pas.

The molding composition may optionally comprise the following other components:
- other polymers, e.g. a homopolyamide which is preferably composed of the monomer combination used in a), or a polyamide elastomer whose polyamide fraction is likewise preferably composed of the monomer combination used in a), and
- conventional auxiliaries and additives, the amounts being those conventional for polyamide molding compositions, examples being stabilizers, lubricants, dyes, or nucleating agents.

This molding composition can be used for production of items, such as moldings or films, which are likewise provided by the invention. In one preferred embodiment, the thickness of the films is from 0.02 to 1 mm, particularly preferably from 0.05 to 0.8 mm, very particularly preferably from 0.1 to 0.6 mm, and with particular preference from 0.2 to 0.5 mm. The film may also be of multilayer design, preferred embodiments being the following:

1. The multilayer film comprises a further layer composed of a polyamide elastomer molding composition, in particular of a polyetheramide or of a polyetheresteramide, and preferably of a polyetheramide or polyetheresteramide on the basis of a linear aliphatic diamine having from 6 to 18, preferably from 6 to 12 carbon atoms, or a linear aliphatic or an aromatic dicarboxylic acid having from 6 to 18, preferably from 6 to 12 carbon atoms, and of a polyether having an average of more than 2.3 carbon atoms per oxygen atom and having a number-average molecular weight of from 200 to 2000. The molding composition of this layer may comprise other blend components, e.g. polyacrylates or polyglutarimides having carboxy or carboxylic anhydride groups or epoxy groups, a rubber containing functional groups, and/or a polyamide. Molding compositions of this type are prior art; they are described by way of example in EP 1 329 481 A2 and DE-A 103 33 005, expressly incorporated herein by way of reference. In order to ensure good layer adhesion it is advantageous here for the polyamide content of the polyamide elastomer to be composed of monomers identical with those used as monomer combination a) in the copolyamide of the other layer.
2. The multilayer film comprises another layer composed of a molding composition on the basis of the same or of a similar copolyamide and/or of a polyamide which is preferably composed of monomers the same as those used as monomer combination a) in the copolyamide of the other layer.
3. The multilayer film comprises an adhesion promoter layer for linkage to the substrate or for bonding within the multilayer film structure, for example a polyolefin functionalized with carboxy groups or with anhydride groups or with epoxy groups, a blend composed of the undermost-layer material and of the substrate material, or a thermoplastic polyurethane.

These embodiments may also be combined with one another. It is always preferable that the layer composed of the copolyamide used according to the invention forms the outer layer. If necessary, for example if there are increased scratch resistance requirements, this outer layer may, if appropriate, also have a protective layer, for example a polyurethane-based clear lacquer. It may also, if appropriate, have been covered with an assembly film which is peeled away after production of the finished part.

The second layer which is the underlayer or which, if there are more than 2 layers, is one of the underlayers, may be a colorless transparent layer, a transparent colored layer, or else an opaque colored layer, in order to permit generation of specific design variants in combination with the transparent outer layer. In these cases, the transparent outer layer can also be printed from the upper side.

Examples of the use of the films are as protective film with respect to soiling, UV radiation, weathering effects, chemicals, or abrasion, as barrier film on vehicles, in the household, on floors, on tunnels, on tents, and on buildings, or as a carrier for decorative effects, for example for topcoats on sports equipment, or internal or external decoration on motor vehicles, on boats, in the household, or on buildings. These possible uses also apply to cases in which the molding composition is an opaque and colored composition. Examples of methods for producing the cohesive bond between film and substrate are adhesive bonding, pressing, lamination, coextrusion, or in-mold coating. To achieve improved adhesion, the film may be pre-flame-treated or pre-plasma-treated, for example.

In one preferred embodiment, the inventive film is used as topcoat for any type of snowboard-like equipment, such as skis or snowboards.

U.S. Pat. No. 5,437,755 describes a known process for applying decorated ski topcoats. In this process, the ski is produced by what is known as the monocoque system, the topcoat initially being composed of two plastics films of which the outer is transparent and the inner is opaque (white). Before the two films are adhesive-bonded to one another, and before the subsequent thermoforming process, the outer side of the transparent upper film and one of the subsequent contact surfaces between the transparent upper film and the opaque lower film are printed with various decorative effects. Suitable plastics stated for the upper film are acrylonitrile-butadiene-styrene copolymer (ABS), acrylonitrile-styrene copolymer (AS), thermoplastic polyurethane (TPU), and aliphatic polyamides, particularly PA11 and PA12. Materials described only for the lower film, which is protected from external effects and is not always printed, are copolyamides, alongside polyesteramides, polyetheramides, modified polyolefins, and styrene-carboxylic anhydride copolymers. However, any of the other known shaping and adhesive-bonding processes may be used to bond the topcoat to the ski or snowboard.

If a single-layer film is used according to the invention, this is transparent and is preferably underside-printed, and in this case a white adhesive or, if appropriate, an adhesive of different color, is used as optical background for bonding the film to the ski.

If a coextruded two-layer film is used, this is preferably composed of a transparent overlayer and of a white- or color-pigmented underlayer as background, the upper side of the film having been printed.

Examples are used below to illustrate the invention.

COMPARATIVE EXAMPLE 1

A copolyamide was used composed of 80 mol % of laurolactam and 20 mol % of caprolactam. Relative solution viscosity $\eta_{rel}$ was 1.9.

COMPARATIVE EXAMPLE 2

A copolyamide was used composed of 80 mol % of laurolactam and 20 mol % of an equimolar mixture composed of hexamethylenediamine and 1,12-dodecanedioic acid, with $\eta_{rel}$ of 1.89.

COMPARATIVE EXAMPLE 3

A copolyamide was used composed of 85 mol % of laurolactam, 7.5 mol % of isophoronediamine and 7.5 mol % of 1,12-dodecanedioic acid, with $\eta_{rel}$ of 1.85.

INVENTIVE EXAMPLE 1

To prepare a CoPA612/IPD12 (90:10), a 200 l stirred autoclave was charged with the following starting materials:
41.03 kg of hexamethylenediamine (in the form of a 68.5% strength aqueous solution),
4.625 kg of isophoronediamine,
62.80 kg of 1,12-dodecanedioic acid, and
19.2 g of a 50% strength aqueous solution of hypophosphorous acid (corresponding to 0.006% by weight).

The starting materials were melted under nitrogen and heated with stirring in the sealed autoclave to about 220° C., the resultant internal pressure being about 20 bar. This internal pressure was retained for 2 hours; the melt was then further heated to 280° C. with continuous depressurization to atmospheric pressure, and then kept for 1.5 hours at this temperature in the stream of nitrogen. Thereafter nitrogen was passed over the melt for a further 3 hours until the torque indicated no further rise in melt viscosity. The melt was then discharged by means of a gear pump and strand-pelletized. The pellets was dried at 80° C. under nitrogen for 24 hours.
Yield: 85 kg
The properties of the product were as follows:

| | |
|---|---|
| Crystallite melting point $T_m$: | 195° C. |
| Relative solution viscosity $\eta_{rel}$: | 1.95 |

INVENTIVE EXAMPLE 2

To prepare a CoPA612/IPD12 (80:20), inventive example 1 was repeated with the following starting weights:
35.93 kg of hexamethylenediamine (in the form of a 68.5% strength aqueous solution),
9.111 kg of isophoronediamine,
61.85 kg of 1,12-dodecanedioic acid, and
19.3 g of a 50% strength aqueous solution of hypophosphorous acid (corresponding to 0.006% by weight).
Yield: 84.1 kg
The properties of the product were as follows:

| | |
|---|---|
| Crystallite melting point $T_m$: | 185° C. |
| Relative solution viscosity $\eta_{rel}$: | 1.93 |

Films of thickness 0.4 mm were extruded from the products of inventive examples 1 and 2 and of comparative examples 1-3, and assessed. The results are presented in the table below.

In the case of the molding compositions with poor processability, severe warpage was noticeable by virtue of slow post-crystallization. Formation of deposits on the take-off rolls was monitored visually.

TABLE

Assessment of molding compositions

| Molding composition from | Transparency | Processability/ deposit formation | Crystallite melting point $T_m$ [° C.] | Crystallization temperature (DSC) [° C.] | enthalpy of fusion [J/g] |
|---|---|---|---|---|---|
| Comparative example 1 | Good | poor, marked deposits | 150 | 85 | 40 |
| Comparative example 2 | Good | poor/deposits | 159 | 89 | 39 |
| Comparative example 3 | Good | poor/deposits | 158 | 90 | 41 |
| Inventive example 1 | Good | good | 195 | 130 | 60 |
| Inventive example 2 | Good | good | 185 | 116 | 43 |

All of the films from inventive example 1 and 2 were easy to decorate by means of thermal diffusion print, but the films of comparative examples 1-3 were deformed in this process. Problematic deposits on the take-off rolls were observed repeatedly on prolonged extrusion in the comparative examples—especially comparative example 1, but in contrast were not observed in the inventive examples.

What is claimed is:

1. A single layer or multi-layer film comprising a first composition which comprises at least 95% by weight of a copolyamide having a melt viscosity of from 250 to 10,000 Pas, which is obtained by polymerizing a monomer composition consisting essentially of:
   a) from 65 to 99 mol % of a substantially equimolar mixture comprising
      an unbranched aliphatic diamine having from 6 to 18 carbon atoms and
      an unbranched aliphatic dicarboxylic acid having from 6 to 18 carbon atoms,
         where said mixture
            comprises an average of from 8 to 12 carbon atoms per monomer,
   and
   b) from 1 to 35 mol % of a substantially equimolar mixture comprising
      a cycloaliphatic diamine having from 8 to 20 carbon atoms and of a non-aromatic dicarboxylic acid having from 6 to 18 carbon atoms, wherein all of the dicarboxylic acids in (b) are non-aromatic.

2. The film as claimed in claim 1, wherein, the copolyamide has a crystallite melting point $T_m$ in the range from 180 to 220° C.

3. The film as claimed in claim 1, wherein, the enthalpy of fusion of the copolyamide is at least 30 J/g.

4. The film as claimed in claim 1, wherein, said a) is selected from the group consisting of hexamethylenediamine/sebacic acid and hexamethylenediamine/1,12-dodecanedioic acid.

5. A printable or printed item which comprises the film as claimed in claim 1.

6. The item as claimed in claim 5, wherein the film is a single-layer film.

7. The film as claimed in claim 1, having a thickness of from 0.02 to 1 mm.

8. The film as claimed in claim 1, which comprises one or more further underlayers, selected from the group of polyamide elastomer, polyamide, copolyamide, and adhesion promoter.

9. The film as claimed in claim 8, wherein one of the underlayers has been transparently or opaquely colored.

10. The film as claimed in claim 1, which is a topcoat for skis or snowboards.

11. The film according to claim 1, wherein said copolyamide exhibits a relative solution viscosity, measured on a 0.5% strength by weight solution in m-cresol at 23° C. to ISO 307, of about 1.5 to about 2.5.

12. The film as claimed in claim 1,
   wherein, the copolyamide has a crystallite melting point $T_m$ in the range from 185 to 210° C.

13. The film as claimed in claim 1,
   wherein, the copolyamide has a crystallite melting point $T_m$ in the range from 190 to 200° C.

14. The film according to claim 1, wherein said copolyamide having a melt viscosity of from 250 to 10,000 Pas is obtained by polymerizing a monomer composition consisting essentially of:
   (a) from 85 to 96 mol % of a substantially equimolar mixture comprising
      an unbranched aliphatic diamine having from 6 to 8 carbon atoms and
      an unbranched aliphatic dicarboxylic acid having from 6 to 18 carbon atoms,
         where said mixture comprises an average of from 8 to 12 carbon atoms per monomer,
   and
   b) from 4 to 15 mol % of a substantially equimolar mixture comprising
      a cycloaliphatic diamine having from 8 to 20 carbon atoms and a non-aromatic dicarboxylic acid having from 6 to 18 carbon atoms, wherein all of the dicarboxylic acids in (b) are non-aromatic.

15. The film as claimed in claim 1, wherein, the enthalpy of fusion of the copolyamide is at least 55 J/g.

16. The film as claimed in claim 1, wherein the mixture has an average carbon number of from 9 to 11 atoms per monomer.

17. The film as claimed in claim 1, wherein the copolyamide has a number average molecular weight of from 200 to 2,000.

18. The film as claimed in claim 14, wherein the mixture has an average carbon number of from 9 to 11 carbon atoms per monomer.

19. The film as claimed in claim 14, wherein the copolyamide has a number average molecular weight of from 200 to 2,000.

20. A single layer or multi-layer film comprising a transparent layer consisting essentially of copolyamide having a viscosity of from 250 to 10,000 Pa·s, wherein the copolyamide contains only aliphatic monomers and is obtained by polymerzing a monomer mixture comprising:
   a) from 65 to 99 mol % of a substantially equimolar mixture comprising
      an unbranched aliphatic diamine having from 6 to 8 carbon atoms and
      an unbranched aliphatic dicarboxylic acid having from 6 to 18 carbon atoms,
         where said mixture
            comprises an average of from 8 to 12 carbon atoms per monomer,
   and
   b) from 1 to 35 mol % of a substantially equimolar mixture comprising
      a cycloaliphatic diamine having from 8 to 20 carbon atoms and a non-aromatic dicarboxylic acid having from 6 to 18 carbon atoms, wherein all of the dicarboxylic acids in (b) are non-aromatic.

21. The film as claimed in claim 20, wherein, the copolyamide has a crystallite melting point $T_m$ in the range from 180 to 220° C.

22. The film as claimed in claim 20, wherein, the enthalpy of fusion of the copolyamide is at least 30 J/g.

23. The film as claimed in claim 20. wherein, said a) is selected from the group consisting of hexamethylenediamine/sebacic acid and hexamethylenediamine/1,12-dodecanedioic acid.

24. A printable or printed item which comprises the film as claimed in claim 20.

25. The item as claimed in claim 20, wherein the film is a single-layer film.

26. The film as claimed in claim 20, having a thickness of from 0.02 to 1 mm.

27. The film as claimed in claim 1, wherein the first composition consists of the copolyamide and the copolyamide consists of a mixture of polymerized monomers (a) and (b).

28. The film as claimed in claim 1, wherein the film is transparent.

29. The film as claimed in claim 1, wherein the copolyamide is obtained by polymerizing a monomer composition that consists of (a) and (b).

* * * * *